(12) United States Patent
Shost et al.

(10) Patent No.: US 6,851,306 B2
(45) Date of Patent: Feb. 8, 2005

(54) METHOD AND APPARATUS FOR PROBE SENSOR ASSEMBLY

(75) Inventors: Mark Anthony Shost, El Paso, TX (US); Duane Zedric Collins, El Paso, TX (US); Samuel Roland Palfenier, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 4 days.

(21) Appl. No.: 10/229,237

(22) Filed: Aug. 27, 2002

(65) Prior Publication Data

US 2004/0042845 A1 Mar. 4, 2004

(51) Int. Cl.[7] ............................................. G01M 15/00
(52) U.S. Cl. ........................ 73/119 R; 73/493; 73/116
(58) Field of Search ............................ 73/35.01, 35.07, 73/116, 117.2, 117.3, 117.1, 119 R, 488, 493

(56) References Cited

U.S. PATENT DOCUMENTS

| | | | | |
|---|---|---|---|---|
| 5,922,953 A | * | 7/1999 | Payne et al. .................. 73/494 |
| 5,951,191 A | * | 9/1999 | Schroeder et al. ............. 403/13 |
| 6,062,529 A | * | 5/2000 | Stevenson et al. ........... 248/674 |
| 6,070,865 A | * | 6/2000 | Schroeder et al. ............. 269/47 |
| 6,123,301 A | * | 9/2000 | Schroeder et al. ........... 248/200 |
| 6,139,211 A | | 10/2000 | Schroeder et al. ............. 403/13 |
| 6,153,070 A | | 11/2000 | Maurer et al. ............... 204/416 |
| 6,176,636 B1 | * | 1/2001 | Stevenson et al. ............. 403/13 |
| 6,272,747 B1 | * | 8/2001 | Schroeder et al. ........ 29/888.01 |
| 6,338,190 B1 | | 1/2002 | Stevenson et al. ............ 29/434 |
| 6,453,732 B2 | * | 9/2002 | Schroeder et al. ............. 73/116 |
| 6,579,030 B2 | * | 6/2003 | Uhler et al. ................. 403/348 |
| 6,588,931 B2 | | 7/2003 | Betzner et al. |
| 6,736,355 B2 | * | 5/2004 | Palfenier et al. .............. 248/70 |
| 6,774,623 B2 | * | 8/2004 | Palfenier et al. ........ 324/207.15 |
| 2003/0230689 A1 | * | 12/2003 | Palfenier et al. ......... 248/309.1 |
| 2004/0069914 A1 | * | 4/2004 | Palfenier et al. ............ 248/200 |

* cited by examiner

Primary Examiner—Eric S. McCall
(74) Attorney, Agent, or Firm—Jimmy L. Funke

(57) ABSTRACT

A sensor package and method of making the same is disclosed in which the sensor package includes a sensor component for electromagnetic sensing having a sensor body with a sensor tip at one end. A sensor housing having a cavity for receiving the sensor component is disposed in a substrate and is aligned with an object to be sensed. The housing further includes a snap-fit interface with the sensor component that is configured to admit and secure the sensor tip during assembly thereof. A bracket is mechanically fixable to the substrate at a first end and is in operable communication with the sensor tip at a second end. The bracket is configured to bias the sensor tip towards the object to be sensed for elimination of an internal air gap between the sensor tip and housing formed during assembly thereof.

34 Claims, 4 Drawing Sheets

METHOD AND APPARATUS FOR PROBE SENSOR ASSEMBLY

TECHNICAL FIELD

The present disclosure relates to a method and apparatus for holding a first object with respect to a second object. More particularly, the present disclosure relates to a bracket system for precisely locating a sensor relative to an object to be sensed. Still more particularly, the present disclosure relates to a bracket system, wherein interaction between the bracket and the body of the sensor results in the sensor being fixed positionally with respect to the bracket, and further results in elimination of an internal air gap between the body of the sensor and a housing in which the sensor is disposed.

BACKGROUND OF THE INVENTION

Magnetic sensors operate on the principle of detecting magnetic flux density modulation caused by the movement of appropriately configured reluctors (or targets). The magnetic sensor must be affixed very close to the reluctor since its sensitivity decreases very rapidly with the size of the air gap between the reluctor and the magnetic sensor. In most automotive applications, for example, the air gaps are on the order of 0.3 to 1.75 mm. Over such a range of air gaps, the sensor output signal decreases more than ten times. The signal attenuation at large air gaps makes the sensor operation more prone to noise induced failures as well as less accurate in detecting the elements of the reluctor as it spins in relation to the magnetic sensor. Both of these factors are often unacceptable in critical engine control and diagnostic applications.

It may at first glance appear that there would be no problem whatsoever to choose and achieve an appropriate air gap between the magnetic sensor and the reluctor. However, in the majority of production cases, the stack-up of tolerances of the many different components randomly cause internal air gaps that influence the net size of the air gap, which consequently precludes achieving, at each assembly, a precisely predetermined external air gap between the magnetic sensor and the reluctor by mere assembly of the parts. As a result, because of the random variations caused by accumulation of tolerances, mere assembly of the parts risks damaging interference between the magnetic sensor and reluctor on the one hand, and inaccurate readings associated with too large a net air gap on the other hand. To lessen all the tolerances so that mere assembly assures, at each assembly, the optimum external air gap is physically difficult to obtain and involves costs associated with manufacturing such precise parts.

The majority of magnetic sensors used in automotive applications involve non-adjustable air gap placement, wherein the stack-up of tolerances results in an internal air gap that causes deviation from the optimal external air gap. For example, a rigid bracket is affixed to the body of a magnetic sensor. The magnetic sensor is placed into a sensor bore in the engine block, and the bracket is bolted, via a bolt hole in the bracket, to a threaded mounting hole in a mounting surface of the engine block. When the bracket is bolted, the length of the sensor body from the bolt hole of the bracket to the sensor tip determines the external air gap with respect to the reluctor, which air gap is affected by the stack-up of tolerances. Even though subject to tolerance related placement inaccuracy, this structural mounting methodology is used widely because of the simplicity of the hardware, and ease of assembly and service.

In situations where external air gap variation cannot be tolerated, the external air gap is preset during magnetic sensor installation by means of an adjustable bracket, often referred to as a "side-mount" bracket. The adjustability of side-mount brackets resides in a bolt slot which allows for the bracket to be adjusted along the slot elongation relative to the threaded mounting hole of the mounting surface.

In one form of operation of the side-mount bracket, the sensor body is placed into the sensor bore of the engine block such that the sensor tip is allowed to touch the surface of the reluctor, and then it is withdrawn a distance equal to the predetermined optimum external air gap. This method is time consuming.

In another form of operation of the side-mount bracket, a gauging layer of soft, abradable material is placed onto the sensor tip, wherein the thickness of the gauging layer is equal to the optimum external air gap. The gauging layer may be either attached to the sensor body or be a part thereof, such as a protuberance, provided the sensor body is of a soft material. Now, the installer need merely place the sensor body into the sensor bore until the gauging layer touches the reluctor, and then tighten the bolt on the mounting surface to thereby hold the sensor body at this position. During initial rotation of the reluctor, a portion of the gauging layer is sacrificial to abrasion due to reluctor runout or differential thermal expansion without damage being incurred to the sensor body or the reluctor.

In the event the magnetic sensor must be re-installed, an abraded gauging layer cannot again provide position location for the sensor tip, as it was formerly able to do when it was unabraded. Therefore, before dismounting the magnetic sensor, the bracket must be marked to indicate the correct position of the sensor body relative to the bracket so that when the new magnetic sensor is re-installed, its position on the bracket can be alignably sighted—not an exact procedure. Indeed, rather than try to reinstall the old, but still usable, sensor using the sighting method to reset the external air gap, a technician would rather install a new sensor having the abradable layer intact, thereby circumventing the sighting step otherwise needed to reinstall the old, but usable, sensor. This results in waste of otherwise good sensors and unnecessary expense for the customer or warranty provider.

In the prior art, it is known to precisely adjust the external air gap using a threaded sensor body housing and threaded sensor bore. This structure is generally used exclusively with magnetic sensors having a single sensing element and having sensing capability unaffected by sensor rotation around its longitudinal axis. In this approach, the housing bottom is brought into touching engagement with the reluctor, and then the sensor body housing is rotated a predetermined angular amount, wherein the pitch angle of the threads raises the housing bottom a distance equal to the optimum external air gap. However, the sensor must then be inserted in the housing making sure that the sensor tip is bottomed out against the inside housing bottom to maintain the set external air gap between the outside bottom of the housing and reluctor. Otherwise, an internal air gap is created reducing the effectiveness of the sensor by altering the net air gap between the sensor tip and the reluctor. The prior art has alleviated problems associated with internal air gaps by heat staking or ultrasonic joining and then biasing the sensor tip to maintain contact with the housing bottom. These approaches prove costly and timely, as well as lacking in longevity.

Accordingly, what is needed in the art is a method and apparatus for assembling a magnetic sensor which is easy and cost effective to install, and provides for automatic setting of an optimal external air gap, while eliminating any internal air gap caused by stack-up tolerances during assembly of the sensor assembly.

SUMMARY OF THE INVENTION

A method and apparatus for assembling a magnetic sensor using snap-fit assembly and a bracket to eliminate any potential air gap as a result of the snap-fit assembly. In an exemplary embodiment, a sensor package includes a sensor component for electromagnetic sensing having a sensor body with a sensor tip at one end. A sensor housing having a cavity for receiving the sensor component is disposed in a substrate and is aligned with an object to be sensed. The housing further includes a snap-fit interface with the sensor component that is configured to admit and secure the sensor tip during assembly thereof. A bracket is mechanically fixable to the substrate at a first end and is in operable communication with the sensor tip at a second end. The bracket is configured to bias the sensor tip towards the object to be sensed for elimination of an internal air gap between the sensor tip and housing formed during assembly thereof.

In another embodiment, a method for elimination of an internal air gap between a sensor body and a sensor housing during assembly thereof while maintaining an air gap between the sensor housing and an object to be sensed is disclosed. The method includes securing a housing in a substrate. The housing has a cavity defined by an open first end configured for displacement of a sensor tip of the sensor body and a second closed end aligned for electromagnetic communication with the object to be sensed when the sensor tip is proximate thereto. The bracket is configured having a first bracket component with a first opening for receiving a mechanical fastener, and a second bracket component. The second bracket component is configured to engage the sensor body and bias the sensor body toward the object when the first bracket component is biased in the same direction. The bracket is mounted upon a surface of the substrate which is parallel to a horizontal axis using the first opening for attaching and translating the bracket with respect to the substrate. The first and second bracket components are displaced relative to each other along a vertical axis. Tooth means is located on at least one of the periphery of the sensor body and a wall defining the housing cavity. The tooth means are configured to allow snap-fit connection when the sensor body is displaced in the housing cavity and the sensor tip is bottomed out against the second closed end of the housing, wherein the tooth means facilitates entry of the sensor body and limits exit with respect to the housing. The tooth means potentially allows an internal air gap after the sensor tip is bottomed out that is eliminated when the mechanical fastener is tightened down with respect to the substrate in the first opening of the bracket.

The above-discussed and other features and advantages of the present invention will be appreciated and understood by those skilled in the art from the following brief description of the drawings.

BRIEF DESCRIPTION OF THE DRAWINGS

Referring to the exemplary drawings, which are meant to be exemplary, not limiting, and wherein like elements are numbered alike in several figures.

DETAILED DESCRIPTION OF THE INVENTION

Figure 1:
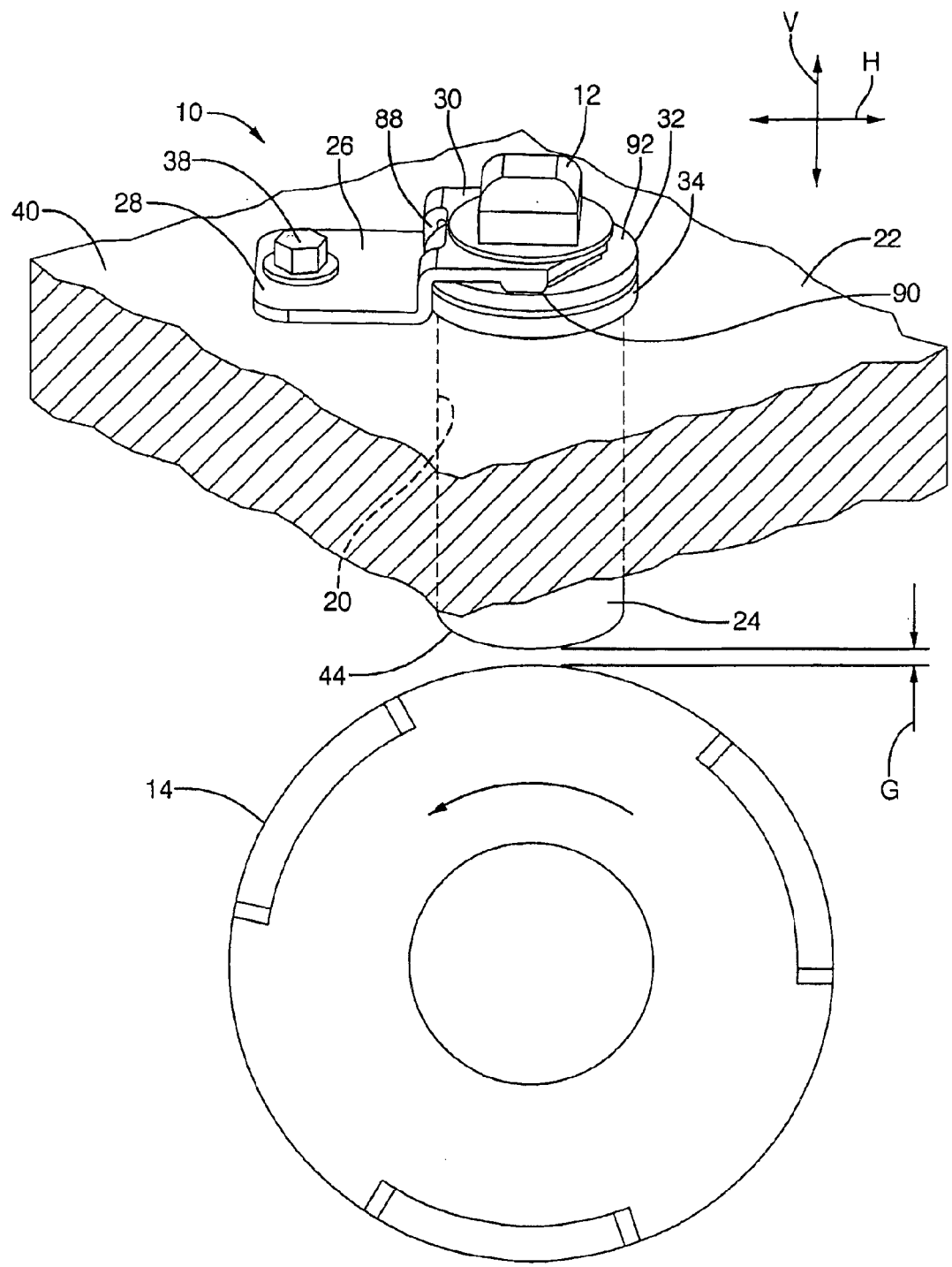
FIG. 1 is a partial perspective view of a bracket sensor system according to one embodiment of the present disclosure, shown in a typical environment of operation wherein a magnetic sensor is spaced from a reluctor a distance equal to an automatically established optimum air gap.
Figure 2:
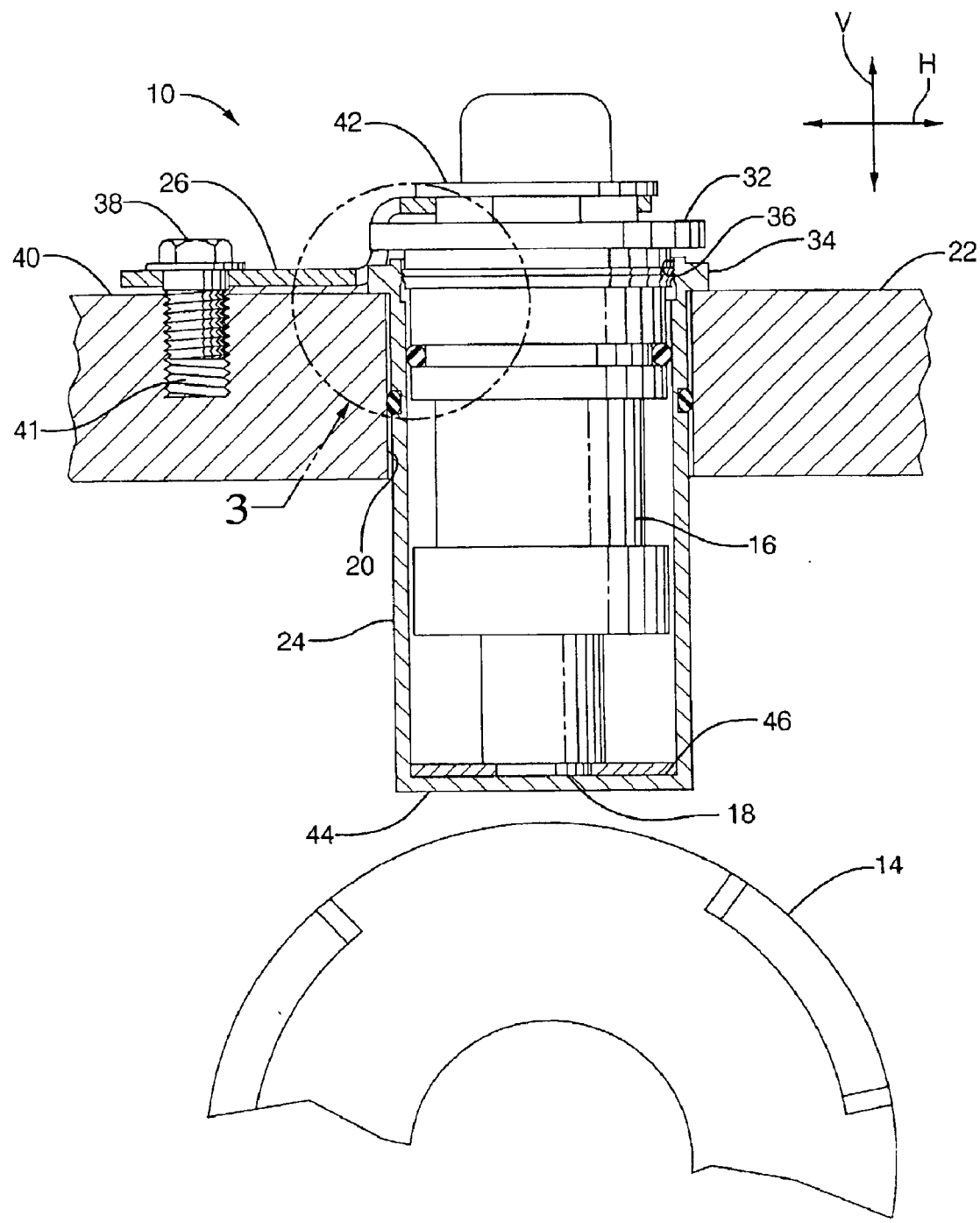
FIG. 2 is a sectional side view of the bracket sensor assembly of FIG. 1 showing a sensor tip having no internal air gap relative to a housing in which the sensor is displaced.

Referring now to the Drawings, FIGS. 1 and 2 generally depict an exemplary embodiment of a sensor probe bracket system 10 according to the present disclosure in an exemplar environment of operation, wherein the bracket system serves to locate a magnetic sensor 12 with respect to a reluctor 14. In this regard, the magnetic sensor 12 has a sensor body 16 which includes a sensor tip 18. The sensor tip 18 extends into a sensor bore 20 of an engine block 22, for example, via sensor housing 24 that is spaced from the reluctor 14 a predetermined distance equal to an optimum air gap G which provides optimal sensing performance by the magnetic sensor of magnetic field variations as the reluctor spins.

A sensor probe component bracket 26 (hereafter, simply "bracket") of the sensor probe bracket system 10 is composed of a first bracket component 28 and a second bracket component 30 which lie substantially parallel with each other and are oriented parallel to a horizontal axis H and normal to the sensor bore 20 (the cylindrical axis of which is along the vertical axis V). First and second bracket components 28, 30 are offset from each other so that second bracket component bracket 30 can engage a first flange 32 extending from a portion of sensor body 16 extending above a second flange 34 of said housing 24. Second flange 34 is disposed outside of port 20 and defines an opening 36 into which sensor tip 18 is initially displaced during assembly thereof. A mechanical fastener 38 such as a bolt or stud with a complementary nut secures the bracket 26 relative to a horizontal surface 40 of engine block 22 in a threaded aperture 41 of engine block 22.

Preferably, the sensor body 16 is placed trappingly into the opening 36 of the sensor housing 24 as part of the manufacturing process. In addition, the sensor body 16 is placed trappingly into a second opening 42 in second component bracket 30 as part of the manufacturing process. This not only ensures that the sensor 12 will remain permanently associated with respect to the bracket 26, but further ensures the orientation of the sensor with respect to the bracket will be correct. The former feature facilitates installation and shipping from an assembly plant while allowing replacement, the latter feature ensures that the sensitive sensor will be properly spaced with respect to the reluctor 14 by eliminating any internal air gaps formed by the former feature. For example, the sensor body 16 may be trapped in sensor housing 24 during shipment to prevent damage to the sensor tip 18 and; the sensor body is prevented from being improperly biased by trapping the sensor body to the bracket 26 for negating incorrect placement of the bracket relative to the sensor body. It is to be understood that those ordinarily skilled in art may utilize any known modality to trap and/or permanently orient the sensor with respect to the bracket, and that the various views of the present disclosure are by way of exemplification and not limitation.

The bracket 26 automatically retains the air gap G between reluctor 14 and outside housing bottom 44 and eliminates any internal air gap between the sensor tip 18 and inside housing bottom 46 when sensor body 16 is installed in housing 24 by holding the sensor body 16 threat via an interaction between the bracket and the sensor body, as will now be detailed with reference to FIGS. 2 through 5 according to an exemplary embodiment.

Figure 3:
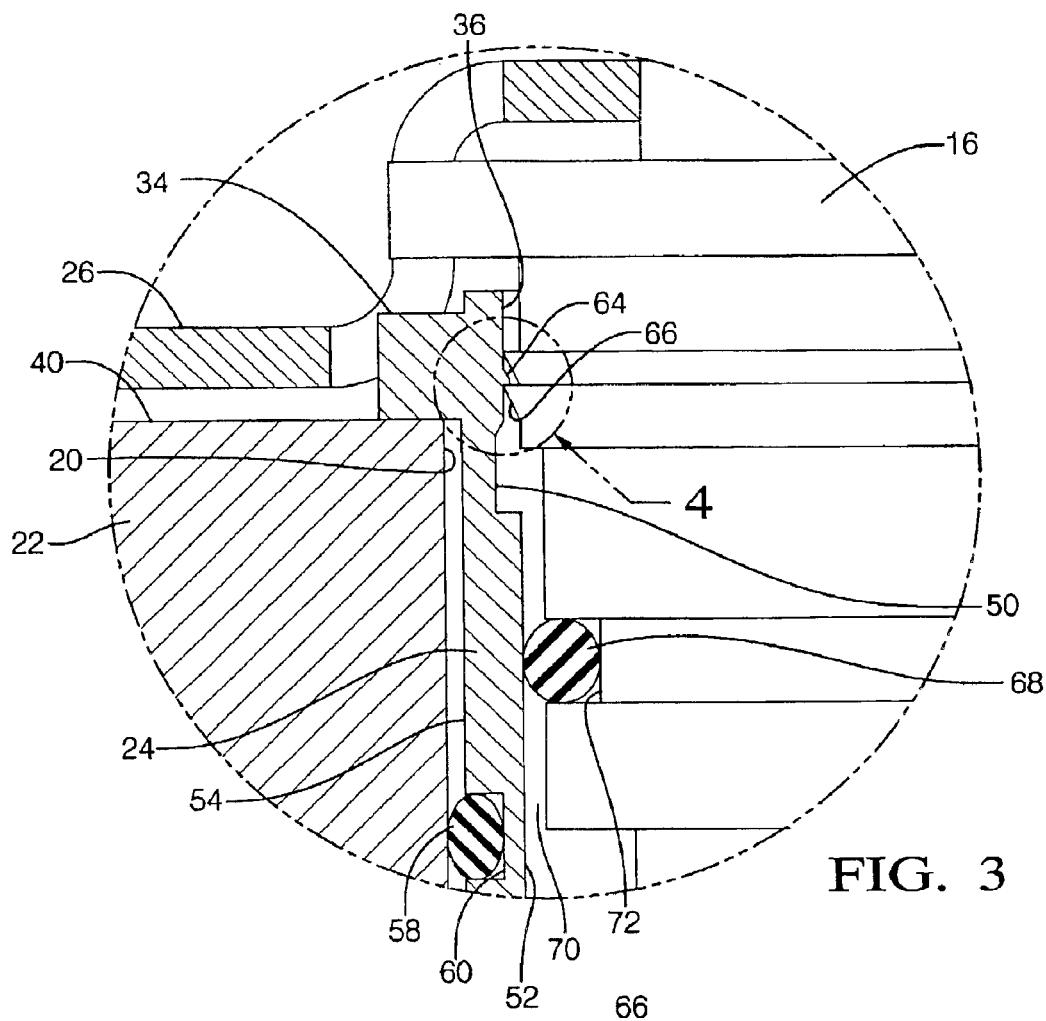
FIG. 3 is an enlarged partly sectional side view of FIG. 2 illustrating a snap-fit connection between the sensor and housing.

FIG. 3 is an enlarged partial view of FIG. 2 detailing engagement between sensor body 16, sensor housing 24, and engine block 22. Housing 24 is substantially cylindrically shaped having a first bore 50 defining opening 36 and a second bore 52 extending to inside bottom housing 46. Housing 24 is further defined by an outside cylindrical wall 54 that extends vertically up to second flange 34 of housing 24. Flange 34 extends past sensor bore 20 to offer support and prevent translation of sensor housing 24 toward reluctor 14. Cylindrical wall 54 is hermetically sealed with port 20 using an O-ring 58 to bridge a gap formed therebetween. In a preferred embodiment, a circumferential channel 60 is configured in cylindrical wall 54 for retention of O-ring 58.

Bore 50 is further defined with a first tapered tooth 64 extending radially inwardly from bore 50 and tapered to facilitate entry of sensor body 16 while engaging a periphery of sensor body 16 and make difficult the exit of the sensor body from housing 24. More specifically, first tapered tooth 64 is configured to provide a snap-fit engagement between housing 24 and sensor body 16 when a periphery of sensor body 16 is complementary configured to cooperate in snap-fit assembly with first tapered tooth 64. For example, a periphery of sensor body 16 may include a plurality of snap-fit connectors 66, preferably resilient, ribs, teeth, grooves, flanges, and the like to cooperate in a snap-fit arrangement with first tapered tooth 64. Alternatively, first tapered tooth 64 may optionally be resilient to facilitate entry of sensor body 16, as well, or in place of complementary snap-fit connectors 66.

Bore 52 is smaller than bore 50 yet large enough to permit translation of sensor body 16 therethrough to allow sensor tip 18 to bottom out against inside bottom housing 46. Bore 52 forms a hermetic seal with a periphery of sensor body 16 using a second O-ring 68 to seal a gap 70 formed between bore 52 and sensor body 16. In a preferred embodiment, sensor body 16 includes a circumferential channel 72 configured therein to retain O-ring 68.

The snap-fit assembly between sensor body 16 and housing 24 will be discussed below in more detail referring to FIGS. 3 and 4. In an exemplary embodiment, snap-fit connectors 66 include a second tapered tooth 74 and a third tapered tooth 76 contiguously aligned with each other. However, it will be recognized that they may be separated resulting in a larger undesired air gap after snap-fit assembly. It will be recognized that second and third tapered teeth 74, 76 have an opposite taper of first tapered tooth 64 to facilitate entry of sensor body 16 in bore 50 in a direction indicated by arrow 78 while substantially limiting exit of the same. Translation of sensor body in a direction opposite arrow 78 is limited by contact of horizontal surfaces 80 on first tapered tooth 64 and second tapered tooth 74. First tapered tooth 64 further includes a vertical flat section 82 for facilitating entry of sensor body 16 while reducing mechanical failure of first tapered tooth 64 by eliminating a pointed tip on tooth 64 that would engage teeth 74 and 76 and provide more friction therebetween.

Figure 4:
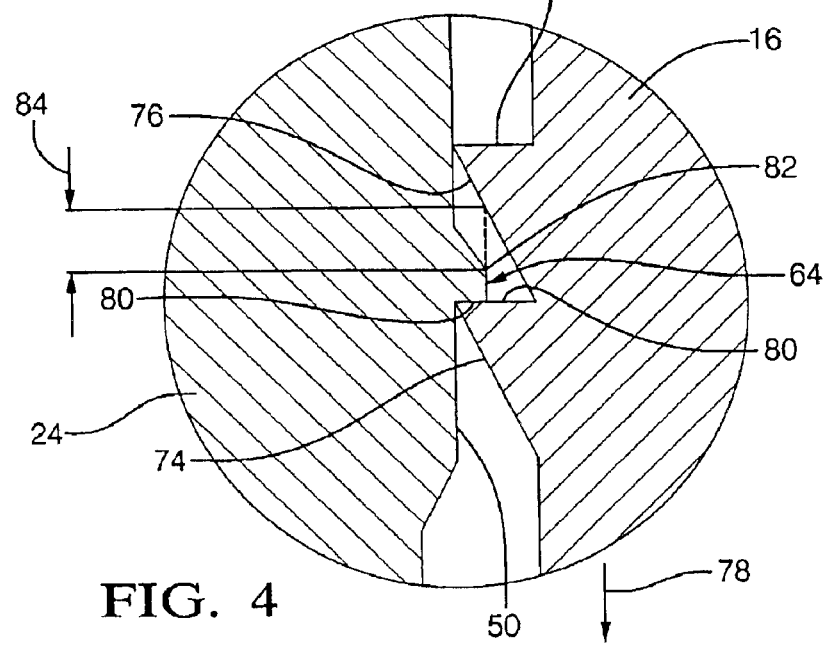
FIG. 4 is an enlarged section view of FIG. 3 illustrating the snap-fit connection in more detail.

In operation and still referring to FIGS. 3 and 4, when sensor body 16 is translated in direction of arrow 78 and sensor tip 18 is bottomed out against inside bottom housing 46, snap fit connectors 66 or preferably teeth 74 and 76 engage first tapered tooth 64 for completing a snap-fit assembly of sensor body 16 with housing 24. However, after compressing the sensor body to the housing to complete the snap-fit assembly, an internal air gap 84 that is some portion of a ratchet pitch between first tapered tooth 64 and second and third tapered teeth 74, 76 results. Air gap 84 represents an amount of allowable translation of sensor body 16 after snap-fit assembly in an opposite direction of arrow 78. Air gap 84 in turn, results in an internal air gap between sensor tip 18 and inside bottom housing 46. It will be understood by one skilled in the pertinent art that a smaller ratchet pitch or pitch angle will limit air gap 84. However, it is desired to eliminate the air gap 84 all together after snap-fit assembly to eliminate any internal air gap between sensor tip 18 and inside bottom housing 46 to optimize the effectiveness of sensor probe 10.

Figure 5:
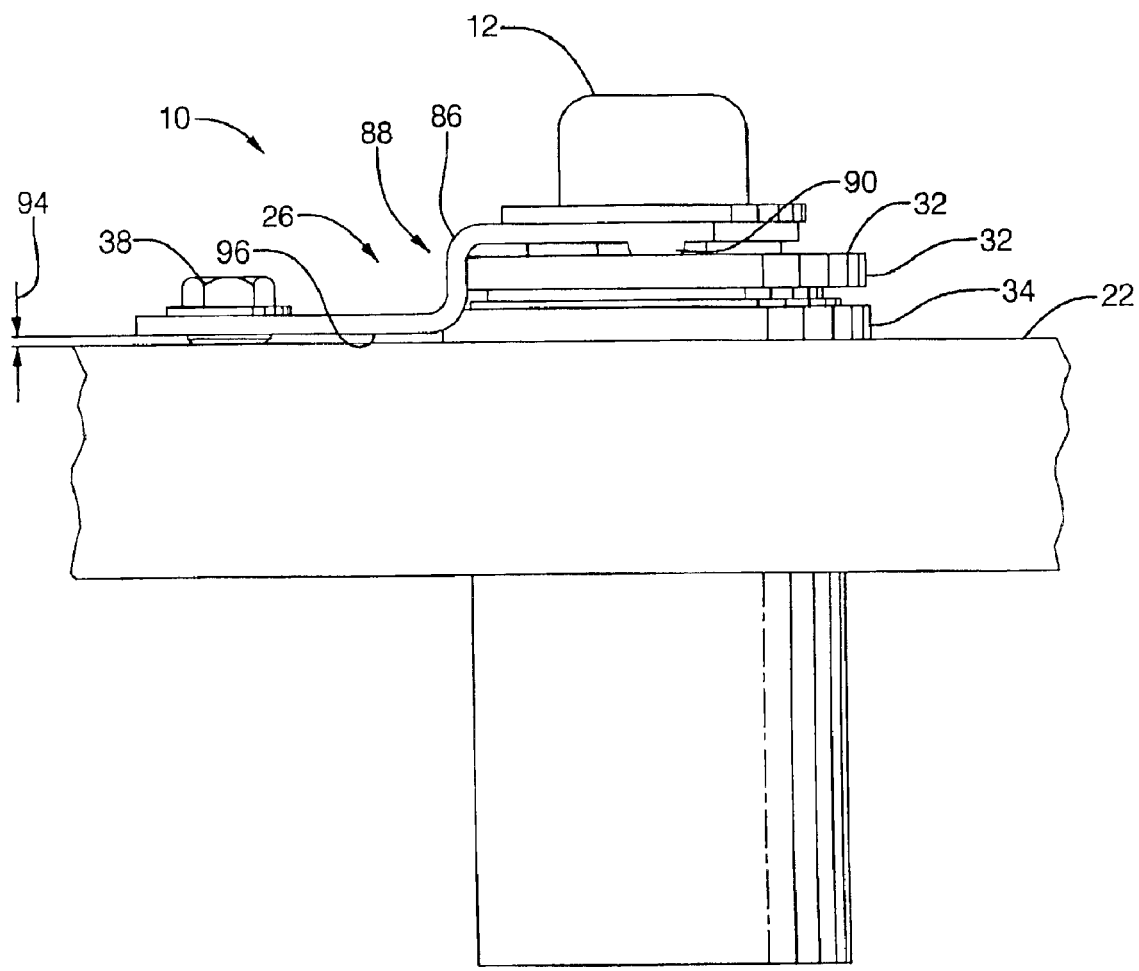
FIG. 5 is a partial side view of the bracket sensor assembly shown in FIG. 1 illustrating the sensor being biased to the bottom of the sensor housing via a bracket bolted to an engine block.

Referring now to FIG. 5, bracket 26 will be described more fully to illustrate an exemplary embodiment thereof for eliminating any internal air gap between sensor tip 18 and inside bottom housing 46 after snap-fit assembly of sensor body 16 and housing 24. First and second bracket components 28 and 30 are connected with one another with a vertical section 86 that is substantially normal to first and second bracket components 28 and 30. Vertical section preferably has cutout 88 (also see FIG. 1) to allow a periphery portion of flange 32 of sensor body 16 to extend therethrough. Bracket 26 having first and second bracket components 28 and 30 with vertical section 86 intermediate therebetween are preferably made of a single stock material. The single stock material is preferably stamped and composed of metal, for example, steel or aluminum. Second bracket component 30 further includes two protrusions 90 stamped therein that are diametrically opposed from each other. The two protrusions 90 are configured to engage a top surface 92 of flange 32 and thus bias sensor tip 18 at middle section thereof. Each protrusion of two protrusions 90 are diametrically opposed thus ensuring that sensor tip bottoms out against inside bottom housing 46 when mechanical fastener 38 is tightened. By tightening fastener 38 after snap-fit assembly of sensor body 16 with housing 24, any potential air gap resulting from such snap-fit assembly is eliminated. In turn, there is an elimination of an internal air gap between sensor tip 18 and inside bottom housing 46. It will be recognized that a suitable gap 94 is available between a bottom surface 96 of first bracket component 28 such that bracket 26 can be translated downward as shown in FIG. 5 to eliminate any air gap 84 (FIG. 4). It will be recognized that the length of vertical section 86 is configured to allow a slightly larger gap 94 than any potential air gap 84, such that bracket 26 may be translated to negate air gap 84 caused by ratchet pitch of snap-fit assembly configuration.

Now, should the magnetic sensor require servicing, it can be easily removed and a new magnetic sensor can be installed in its place, using the installation procedure outlined above. In the case of installation of a new magnetic sensor, the sensor body is assembled with the sensor housing lodged together so as to resist separation using the ratchet teeth formed in both. Consequently, the magnetic sensor can be re-installed using the snap fit to bottom Out the sensor tip against the bottom of the housing until the bracket is tightened down to take up the play and resulting internal air gap between the sensor tip and housing. Thus, the same air gap can be obtained between the reluctor and outside bottom of the sensor housing because any internal air gap as a result of the stack-up tolerance between the sensor housing and sensor body is eliminated.

Accordingly, the above described method and apparatus afford simple and cost effective means to assemble a sensor body with a housing and eliminating any internal air gap associated with snap-fit assembly thereof. In addition, such means of assembly and maintaining an optimum air gap between the sensor and reluctor proves to extend the longevity thereof by eliminating a biasing spring that is subject to degradation. The above described method and apparatus allows more flexibility and allows a snap-fit assembly to maintain engagement between the sensor and housing when the bracket is not mounted to an engine or transmission block and is non-functional when the bracket is mechanical fastened and biased toward the engine or transmission block. Thus, improving longevity of the snap-fit engaging means by not relying thereon after assembly to a motor vehicle. By using the snap-fit engagement and the bracket assembly in conjunction with a sensor assembly, simplicity, cost savings, and reliability can be gained.

While preferred embodiments have been shown and described, various modifications and substitutions may be made thereto without departing from the spirit and scope of the invention. Accordingly, it is to be understood that the apparatus and method have been described by way of illustration only, and such illustrations and embodiments as have been disclosed herein are not to be construed as limiting to the claims.

What is claimed is:

1. A sensor package comprising:
    a sensor component for electromagnetic sensing, said sensor component including a sensor body having a sensor tip at one end;
    a sensor housing having a cavity for receiving said sensor component therein and a snap-fit interface with said sensor component, said interface configured to admit and secure said sensor tip therein, said housing disposed in a substrate and is aligned with an object to be sensed; and
    a bracket mechanically fixable to said substrate at a first end and in operable communication with said sensor tip at a second end, said bracket configured to bias said sensor tip towards said object to be sensed for elimination of an internal air gap between said sensor tip and housing formed during assembly thereof.

2. The sensor package according to claim 1, wherein said snap-fit interface includes a first tapered tooth extending from a cylindrical wall defining said cavity, said first tapered tooth configured to facilitate entry of said sensor component while engaging said sensor component and limiting exit of said sensor component.

3. The sensor package according to claim 2, wherein said second end of said bracket engages said sensor component extending from said housing while said first end of said bracket biases said second end towards said housing when a distance between said first end and said substrate is reduced.

4. The sensor package according to claim 3, wherein said first end includes an aperture therethrough for a mechanical fastener to pass therethrough and said substrate includes a threaded aperture for receiving said mechanical fastener, said mechanical fastener operably acting against said first end to bias said bracket towards said substrate.

5. The sensor package according to claim 4, wherein said mechanical fastener is one of a bolt and a stud with a complementary nut.

6. The sensor package according to claim 2, wherein said snap-fit interface includes a second tapered tooth and a third tapered tooth configured on a periphery of said sensor body, said second tapered tooth and said third tapered tooth having opposite taper configurations from said first tapered tooth to facilitate entry and limit exit of said sensor body relative to said sensor housing.

7. The sensor package according to claim 6, wherein said second tapered tooth is contiguous to said third tapered tooth to reduce an internal air gap between said sensor tip and said housing.

8. The sensor package according to claim 7, wherein said first tapered tooth is configured having a base width slightly smaller than base widths of said second and third tapered teeth, said smaller width providing a potential for an internal air gap between said sensor tip and said housing, said potential air gap is taken up by urging said bracket toward said substrate.

9. The sensor package according to claim 7, wherein said second and third tapered teeth have a pitch conducive to reduce an internal air gap between said sensor tip and said housing caused by said first tooth having a base width smaller than a base width of said second and third tapered teeth.

10. The sensor package according to claim 1, wherein said sensor component is configured to hermetically seal with said housing upon installation of said sensor in said housing, said housing configured to hermetically seal with said substrate upon installation of said housing in said substrate.

11. The sensor package according to claim 10, wherein a periphery of said sensor and said housing include a circumferential channel configured therein, each channel receptive of an o-ring to form said hermetic seals.

12. The sensor package according to claim 1, wherein said snap-fit interface further comprises:
    resilient means for allowing entry of said sensor component within said housing while limiting exit of the same.

13. The sensor package according to claim 1, wherein said second end of said bracket is configured to engage a flange extending from said senor body for urging said sensor tip to bottom out against said housing.

14. The sensor package according to claim 1, wherein said second end of said bracket is configured to engage a channel configured in said sensor body extending from said housing, said second end having two diametrically opposed protrusions extending therefrom and, said two diametrically opposed protrusions configured to engage a lower portion defining said channel and urge said sensor tip to bottom out against said housing when said first end of said bracket is urged toward said substrate.

15. A sensor probe assembly for a motor vehicle comprising:
    a housing having a central bore and a first end open to the central bore, said housing installed in a substrate, said housing having a second end opposite said first end, said second end aligned with an object to be sensed;
    a first elastomeric media seal circumferentially disposed around said housing to form a hermetic seal between said substrate and said housing;
    a sensor body within the bore of said housing having a sensor tip contiguous to said second end of said housing with a sensing area and a second opposing side extending from said bore for connection with patterned electrical leads in electrical communication with the sensing area, the sensing area in electromagnetic communication with the object to be sensed;
    a second elastomeric media seal circumferentially disposed around said sensor body to form a hermetic seal between said sensor body and said housing;

a bracket assembly mechanically fixable to said substrate at a first end and in operable communication with said second opposing side of said sensor body, said bracket configured to bias said sensor tip towards said object to be sensed for elimination of an internal air gap between said sensor tip and housing formed during assembly thereof; and a means for snap-fit assembly between said housing and said sensor body.

16. The sensor probe assembly according to claim 15, wherein said means for snap-fit assembly includes a first tapered tooth extending from a cylindrical wall defining said bore, said first tapered tooth configured to facilitate entry of said sensor body while engaging said sensor body and making difficult exit of said sensor body.

17. The sensor probe assembly to claim 16, wherein said second end of said bracket engages said sensor body extending from said housing while said first end of said bracket biases said second end towards said housing when a distance between said first end and said substrate is reduced.

18. The sensor probe assembly according to claim 17, wherein said first end includes an aperture therethrough for a mechanical fastener to pass therethrough and said substrate includes a threaded aperture for receiving said mechanical faster, said mechanical fastener operably acting against said first end to bias said bracket towards said substrate.

19. The sensor probe assembly according to claim 18, wherein said mechanical fastener is one of a bolt and a stud with a complementary nut.

20. The sensor probe assembly according to claim 16, wherein said snap-fit assembly includes a second tapered tooth and a third tapered tooth configured on a periphery of said sensor body, said second tapered tooth and said third tapered tooth having opposite taper configurations from said first tapered tooth to facilitate entry and prevent exit of said sensor body relative to said sensor housing.

21. The sensor probe assembly according to claim 20, wherein said second tapered tooth is contiguous to said third tapered tooth to reduce an internal air gap between said sensor tip and said housing.

22. The sensor probe assembly according to claim 21, wherein said first tapered tooth is configured having a base width slightly smaller than base widths of said second and third tapered teeth, said smaller width providing a potential for an internal air gap between said sensor tip and said housing, said potential air gap is taken up by urging said bracket toward said substrate.

23. The sensor probe assembly according to claim 21, wherein said second and third tapered teeth have a pitch conducive to reduce an internal air gap between said sensor tip and said housing caused by said first tooth having a base width smaller than a base width of said second and third tapered teeth.

24. The sensor probe assembly according to claim 15 wherein said sensor component configured to hermetically seal with said housing upon installation of said sensor in said housing, said housing configured to hermetically seal with said substrate upon installation of said housing in said substrate.

25. The sensor probe assembly according to claim 24, wherein a periphery of said sensor and said housing include a circumferential channel configured therein, each channel receptive of an o-ring to form said hermetic seals.

26. The sensor probe assembly according to claim 15, wherein said snap-fit assembly further comprises:

resilient means for allowing entry of said sensor component within said housing while limiting exit of the same.

27. The sensor probe assembly according to claim 15, wherein said snap-fit assembly further comprises:

ratchet means for allowing entry of said sensor component within said housing while limiting exit of the same.

28. The sensor probe assembly according to claim 15, wherein said second end of said bracket is configured to engage a flange extending from said senor body for urging said sensor tip to bottom out against said housing.

29. The sensor probe assembly according to claim 15, wherein said second end of said bracket is configured to engage a channel configured in said sensor body extending from said housing, said second end having two diametrically opposed protrusions extending therefrom and, said two diametrically opposed protrusions configured to engage a lower portion defining said channel and urge said sensor tip to bottom out against said housing when said first end of said bracket is urged toward said substrate.

30. A system for elimination of an internal air gap between a sensor body and a sensor housing during assembly thereof while maintaining an air gap between the sensor housing and an object to be sensed, said system comprising:

a bracket comprising a first bracket component having a first opening, and a second bracket component, said second bracket component configured to engage the sensor body and bias the sensor body toward the object when said first bracket component is biased in the same direction;

a mounting means for mounting said bracket upon a surface of a substrate which is parallel to a horizontal axis, said mounting means in operable communication with said first opening, said mounting means for attaching and translating said bracket with respect to said substrate, displacement means for displacing the first and second bracket components relative to each other along a vertical axis;

a housing securely fixed in said substrate, said housing having a cavity defined by an open first end configured for displacement of a sensor tip of said sensor body and a second closed end aligned for electromagnetic communication with said object when said sensor tip is proximate thereto; and snap-fit means located at at least one of said periphery of the sensor body and a wall defining said cavity for snap-fit connection when sensor body is displaced in said cavity and said sensor tip is bottomed out against said second closed end, wherein said snap-fit means facilitates entry of said sensor body and limits exit with respect to said housing; wherein said snap-fit means potentially allows an internal air gap after sensor tip is bottomed out that is eliminated when said mechanical fastener is tightened down with respect to said substrate.

31. The system of claim 30, wherein said mounting means and displacement means comprise:

a bolt having a threaded shank threadably engageable with a threaded mounting hole in said substrate; and means engaged on said bolt for causing said first and second bracket members to be mutually displaced relative to each other as said bolt is tightened.

32. The system of claim 31, wherein said snap-fit means causes said sensor body to be engaged such that said sensor body is constrained from movement therewith along said vertical axis when said sensor tip is bottomed out against said housing.

33. A method for elimination of an internal air gap between a sensor body and a sensor housing during assembly thereof while maintaining an air gap between the sensor housing and an object to be sensed, the method comprising:
  securing a housing in a substrate, said housing having a cavity defined by an open first end configured for displacement of a sensor tip of said sensor body and a second closed end aligned for electromagnetic communication with said object when said sensor tip is proximate thereto;
  configuring a bracket having a first bracket component with a first opening for receipt of a mechanical fastener, and a second bracket component, said second bracket component configured to engage the sensor body and bias the sensor body toward the object when said first bracket component is biased in the same direction;
  mounting said bracket upon a surface of said substrate which is parallel to a horizontal axis using first opening for attaching and translating said bracket with respect to said substrate,
  displacing the first and second bracket components relative to each other along a vertical axis;
  locating snap-fit means on at least one of said periphery of the sensor body and a wall defining said cavity, said snap-fit means configured to allow snap-fit connection when sensor body is displaced in said cavity and said sensor tip is bottomed out against said second closed end, wherein said snap-fit means facilitates entry of said sensor body and limits exit with respect to said housing;
  wherein said snap-fit means potentially allows an internal air gap after said sensor tip is bottomed out that is eliminated when said mechanical fastener is tightened down with respect to said substrate.

34. A method for elimination of an internal air gap between a sensor body and a sensor housing during assembly thereof while maintaining an air gap between the sensor housing and an object to be sensed, the method comprising:
  securing a housing in a substrate, said housing having a cavity defined by an open first end configured for displacement of a sensor tip of said sensor body and a second closed end aligned for electromagnetic communication with said object when said sensor tip is proximate thereto;
  configuring a bracket having a first bracket component with a first opening for receipt of a mechanical fastener, and a second bracket component, said second bracket component configured to engage the sensor body and bias the sensor body toward the object when said first bracket component is biased in the same direction;
  mounting said bracket upon a surface of said substrate which is parallel to a horizontal axis using first opening for attaching and translating said bracket with respect to said substrate,
  displacing the first and second bracket components relative to each other along a vertical axis;
  locating ratchet means on between the sensor body and a wall defining said cavity, said ratchet means configured to allow snap-fit connection when sensor body is displaced in said cavity and said sensor tip is bottomed out against said second closed end, wherein said ratchet means facilitates entry of said sensor body and limits exit with respect to said housing;
  wherein said ratchet means potentially allows an internal air gap after sensor tip is bottomed out that is eliminated when said mechanical fastener is tightened down with respect to said substrate.

* * * * *